United States Patent [19]
Kimoto et al.

[11] Patent Number: 5,516,176
[45] Date of Patent: May 14, 1996

[54] RESILIENT SUPPORTING DEVICE FOR OPERATOR CABIN

[75] Inventors: Kenzo Kimoto; Masakazu Yanagisawa, both of Hirakata, Japan

[73] Assignee: Kabushiki Kaisha Komatsu Seisakusho, Tokyo, Japan

[21] Appl. No.: 240,672

[22] PCT Filed: Nov. 6, 1992

[86] PCT No.: PCT/JP92/01437

§ 371 Date: May 4, 1994

§ 102(e) Date: May 4, 1994

[87] PCT Pub. No.: WO93/09302

PCT Pub. Date: May 13, 1993

[30] Foreign Application Priority Data

Nov. 6, 1991 [JP] Japan ................................. 3-318411
Jan. 29, 1992 [JP] Japan ................................ 4-008456 U

[51] Int. Cl.⁶ .................................................. B62D 24/00
[52] U.S. Cl. ......................... 216/35.1; 248/562; 248/635; 248/636; 267/140.13
[58] Field of Search ....................... 296/35.1; 248/562, 248/635, 636; 267/140.11, 140.13, 293

[56] References Cited

U.S. PATENT DOCUMENTS

| | | | |
|---|---|---|---|
| 2,147,660 | 2/1939 | Loewus | 248/635 |
| 2,181,570 | 11/1939 | Piron | 248/635 |
| 4,610,438 | 9/1986 | Eberhard et al. | 248/562 |
| 5,195,728 | 3/1993 | Skipper | 267/141.3 |

FOREIGN PATENT DOCUMENTS

| | | | |
|---|---|---|---|
| 3522333 | 1/1987 | Germany | 267/140.13 |
| 60-148368 | 10/1985 | Japan . | |
| 24048 | 2/1987 | Japan | 248/562 |
| 62-185761 | 11/1987 | Japan . | |
| 2-45881 | 3/1990 | Japan . | |
| 101835 | 9/1992 | Japan . | |
| 1481130 | 5/1989 | U.S.S.R. | 296/35.1 |

*Primary Examiner*—Dennis H. Pedder
*Attorney, Agent, or Firm*—Richards, Medlock & Andrews

[57] ABSTRACT

A shock absorbing device provided with a damping plate damper having a viscosity damper includes: a case body comprising an upper flange, a body portion, and a lower flange; a collared resilient member provided with a body portion and a collar portion, an outer surface of the body portion and an undersurface of the collar portion being connected to the case body; a center shaft connected to the central portion of the collared resilient member; a damping plate fixed to the bottom end portion of the center shaft; and a damper case fixed to the bottom end of the case body and filled with a viscous substance. An operator cabin of a construction machine is resiliently supported to the vehicle body through the shock absorbing device. For this reason, the number of natural vibration of the operator cabin during high speed running of a hydraulic power shovel is increased, whereby resonance thereof with the gear engaging frequencies of a caterpillar track and a sprocket wheel is avoided, so that effective damping effects can be achieved against the number of excited vibrations applied in wide ranges by the construction machines and the like, thus improving riding comfort for an operator and the mechanical strength of the operator cabin.

20 Claims, 6 Drawing Sheets

RESILIENT SUPPORTING DEVICE FOR OPERATOR CABIN

TECHNICAL FIELD

The invention relates to an operator cabin mounted on a construction machine, such as a hydraulic power shovel, and more particularly, to a resilient supporting device for resiliently supporting an operator cabin on a vehicle body.

BACKGROUND ART

FIG. 9 is a side view showing the appearance of a typical hydraulic power shovel applied to general use, including an operator cabin 1, an upper turning body 2, an upper turning body frame 2a, and a lower traveling body 3.

FIG. 10 is a longitudinal section showing the relation of placement between the operator cabin 1 and the upper turning body frame 2a, in which a floor plate 21a of the operator cabin 1 is mounted by a shock absorbing device 24 to a supporting frame 22b to which the upper turning body frame 2a is welded.

FIG. 12 is a longitudinal section showing the detail of the related connection between the floor plate 21a, the supporting frame 22b, and the shock absorbing device 24. In FIG. 12, a resilient member 24a, which fills up a case 24c, arranged between the floor plate 21a and the supporting frame 22b, and a resilient member 24b, which fills up a case 24d, sandwich the supporting frame 22b therebetween. A floor boss 21b welded on the floor plate 21a penetrates the case 24c, the resilient member 24a, the case 24d, and the resilient member 24b, and a bolt 26 is fastened to the floor boss 21b, so that a predetermined distance is provided between the resilient members 24a and 24b for tightening the floor plate 21a and the supporting frame 22b during assembly. Also, a bracket 21c, which is welded on the frame of the operator cabin 1, is fastened to the floor plate 21a by a bolt 27.

In this manner, as shown in FIG. 11, four shock absorbing devices 24 are placed in both corners of the front and back ends of the operator cabin 1. Resilient members 25 are placed between the periphery of the floor boss 21b and the periphery of the holes in the supporting frames 22b through which the floor boss 21b extends, so that the horizontal surface of the operator cabin 1 can be resiliently located against the upper turning body frame 2a. However, in the prior art mentioned above, since the floor plate 21a of the operator cabin 1 is connected to the supporting frame 22b of the upper turning body 2 by the four shock absorbing devices 24, the number of natural vibrations of the operator cabin 1 becomes small, whereby the number of natural vibrations of the operator cabin 1 during high speed running of a hydraulic power shovel becomes close to the gear engaging frequencies provided by a caterpillar track and a sprocket wheel, so that the operator cabin 1 resonates therewith. For this reason, the vibration of the operator cabin 1 is increased, especially the rolling from side to side is increased. While the main object of the above-mentioned prior art is to provide shock absorbing effects by the shock absorbing devices 24, damping effects against increased vibrations produced by resonance of the operator cabin 1 are not effective, thus deteriorating the riding comfort for an operator during high speed running as well as the mechanical strength of the operator cabin 1.

Therefore, an object of the present invention is to solve the above-mentioned problems and provide the resilient supporting construction of the operator cabin 1 against the vehicle body to reduce vibrations, particularly during high speed running of the hydraulic power shovel, and prevent trailing turns of resilient members during assembly of the shock absorbing devices 24.

BRIEF DESCRIPTION OF THE DRAWINGS

FIG. 2 is a detailed longitudinal section of a shock absorbing device having a damping plate damper 4 of FIG. 1, showing related connection between a floor plate 1a of the operator cabin 1 and a supporting frame 2b of the upper turning body frame 2a.

SUMMARY OF THE INVENTION

Figure 1:
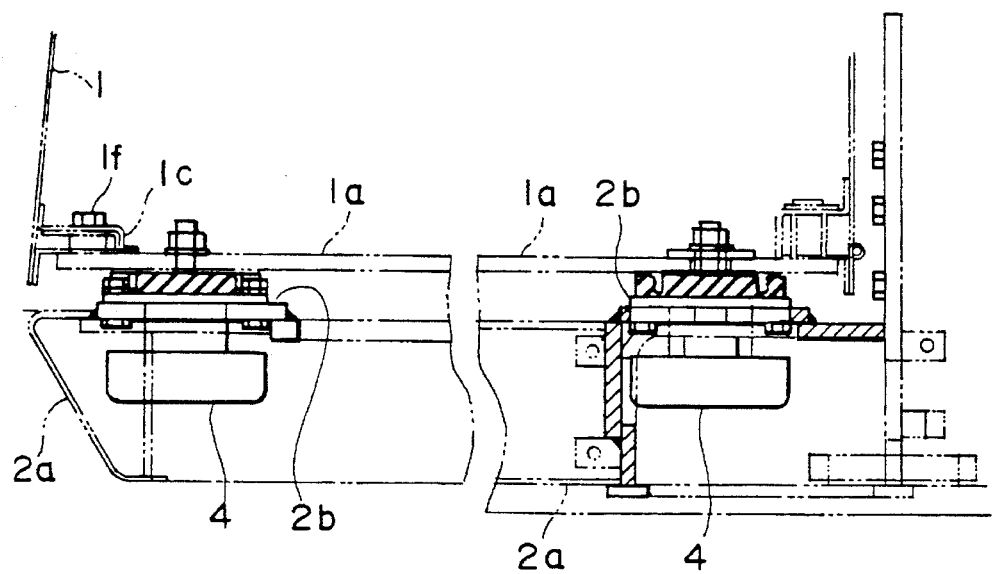
FIG. 1 is a longitudinal section of a first embodiment according to the present invention, showing an overview of related placement of a shock absorbing device, having a damping plate damper 4, to an upper turning body frame 2a and an operator cabin 1.

The first aspect of the present invention is to provide a resilient supporting device for resiliently supporting an operator cabin on a vehicle body of a construction machine, the resilient supporting device comprising a shock absorbing device with a damping plate damper, so that remarkable shock absorbing and damping effects can be achieved against a number of excited vibrations applied in wide ranges by the construction machine.

The second aspect of the present invention is to provide a shock absorbing device, with a damping plate damper having a viscosity damper according to the first aspect of the present invention, including: a case body having an upper flange, a body portion, and a lower flange; a collared resilient member provided with a body portion and a collar portion, an outer surface of the body portion and an undersurface of the collar portion being connected to the case body; a center shaft connected to the central portion of the collared resilient member; a damping plate fixed to the bottom end of the center shaft; and a damper case fixed to the bottom end of the case body and filled with a viscous substance; whereby the operator cabin is secured to the upper portion of the center shaft and is supported on the upper surface of the collar portion of the collared resilient member. For this reason, effective shock absorbing and damping effects in the upper and lower side directions can be achieved against a number of excited vibrations applied in wide ranges by the construction machines and the like. Moreover, the collar portion and the body portion of the collared resilient member resiliently resist any inclination to the vertical by the center shaft, the upper portion of which is secured to the operator cabin, whereby rolling vibrations in every side direction can be certainly reduced.

The third aspect of the present invention is to provide a shock absorbing device, with a damping plate damper having a viscosity damper according to the second aspect of the present invention, wherein an upper resilient stopper is connected to the case body for controlling lower movement of the operator cabin and which is spaced a predetermined distance from the periphery of the collar portion of the collared resilient member, and wherein a lower resilient stopper for controlling upper movement of the operator cabin is connected to the lower surface of the damping plate. Therefore, after moving downwardly and striking the upper resilient stopper, the operator cabin moves downwardly in a state of increasing spring constant; after moving upwardly and striking the lower resilient stopper, the operator cabin moves upwardly in a state of increasing spring constant; whereby remarkable shock absorbing effects can be achieved in upper and lower movement of the operator cabin. Thus, according to the first to third aspects of the present invention, remarkable effects can be obtained as follows:

(1) Since effective shock absorbing and damping effects are achieved against a number of excited vibrations applied in wide ranges by the construction machines and the like, riding comfort for an operator and the durability of the operator cabin can be improved without even one of devices being adjusted in response to the number of excited vibrations in wide ranges.

(2) Without even one of devices being adjusted in response to the number of excited vibrations applied in wide ranges by the construction machines and the like, effective shock absorbing and damping effects in the upper and lower side directions are achieved. Moreover, rolling vibrations in every side direction, which is a big problem in the prior art, can be certainly reduced so that riding comfort for an operator and the durability of the operator cabin can be remarkably improved.

(3) After striking each resilient stopper, in a state of increasing spring constant, upper and lower movement of the operator cabin is controlled, whereby effective shock absorbing effects can be achieved for the operator cabin, thus improving riding comfort for an operator and the durability of the operator cabin.

The fourth aspect of the present invention is to provide a shock absorbing device with a damping plate damper having a viscosity damper, including: a case body comprising an lower flange, a body portion, and a lower flange; a collared resilient member provided with a body portion and a collar portion, an outer surface of the body portion and an undersurface of the collar portion being connected to the case body; a center shaft connected to the central portion of the collared resilient member; a damping plate fixed to the bottom end portion of the center shaft; and a damper case fixed to the bottom end of the case body and filled with a viscous substance; whereby the collar portion of the collared resilient member and the operator cabin are fixed to each other through a spacer by the center shaft, and the lower flange of the case body is fixed to the vehicle body; and the improvement wherein the spacer and the center shaft have mating flats, and a turning prevention device is provided adjacent to the center shaft and the spacer for preventing twisting of the center shaft.

The fifth aspect of the present invention is to provide a shock absorbing device with a damping plate damper having a viscosity damper including: a case body comprising an lower flange, a body portion, and a upper flange; a collared resilient member provided with a body portion and a collar portion, an outer surface of the body portion and an undersurface of the collar portion being connected to the above-described case body; a center shaft connected to the central portion of the collared resilient member; a damping plate fixed to the bottom end portion of the center shaft; and a damper case fixed to the bottom end of the case body and filled with a viscous substance; whereby the collar portion of the collared resilient member and the operator cabin are fixed to each other through a spacer by the center shaft, and the lower flange of the case body is fixed to the vehicle body; and the improvement wherein a lockpin is provided to engage the center shaft and the spacer, and a turning prevention device is provided adjacent to the center shaft and the spacer for preventing twisting of the center shaft. Therefore, according to the fourth and fifth aspects of the present invention, trailing turns are prevented during tightening by an impact wrench, whereby the twisting of the resilient member can be avoided, thus enabling certain fastening by the impact wrench and preventing inconveniences provided by flexure. Furthermore, such a mechanism can improve the durability of the rubber mount and facilitate the placement of the turning prevention device adjacent to the center shaft and the spacer.

BEST MODE FOR CARRYING OUT THE INVENTION

In FIG. 1, showing a first embodiment of the present invention, there are provided a floor plate 1a engaged by a bolt 1f with a bracket 1c welded to an operator cabin 1, a supporting frame 2b welded to an lower turning body frame 2a, and a shock absorbing device provided with a damping plate damper 4 for resiliently supporting the floor plate 1a of the operator cabin 1 to the supporting frame 2b to which the lower turning body frame 2a is welded.

Figure 2:
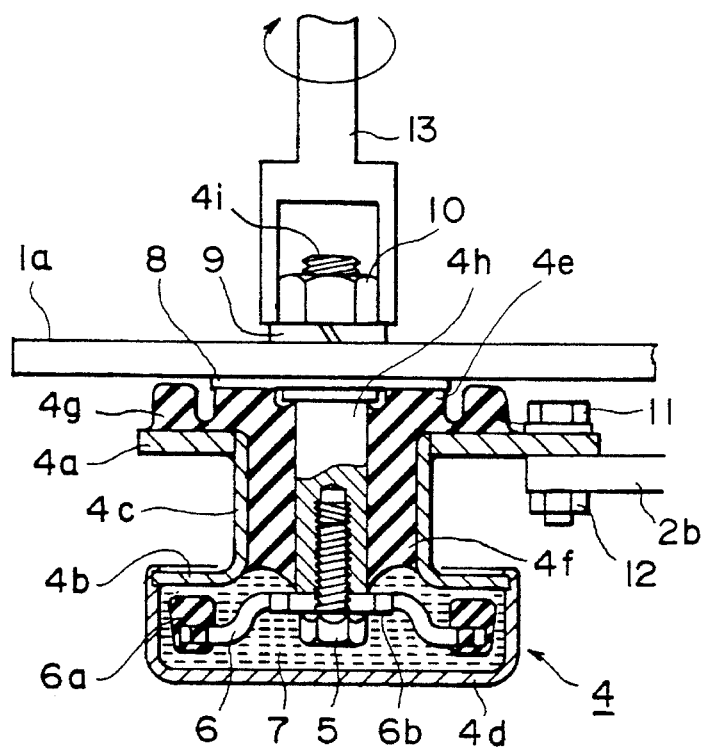

In FIG. 2, the shock absorbing device provided with a damping plate damper 4 includes a case body comprising an lower flange 4a, a upper flange 4b, and a body portion 4c; a collared resilient member comprising a resilient member collar portion 4e, a resilient member body portion 4f, and an upper resilient stopper portion 4g; a center shaft 4h penetrating a central portion of the resilient member collar portion 4e and of the resilient member body portion 4f; a damping plate 6 secured by a bolt 5 to a upper end of the center shaft 4h; a lower resilient stopper 6a connected to the periphery of an upper surface of the damping plate 6; holes 6b provided in the damping plate 6; and a viscosity damper comprising a damper case 4d attached to the lowers flange 4b and filled with silicon oil.

An undersurface of the resilient member collar portion 4e contacts an uppersurface of the upperflange 4a of the case body, an outer surface of the resilient member body portion 4fcontacts an internal surface of the body portion 4c of the case body, and the periphery surface of the center shaft 4h contacts the inner periphery surface of the resilient member collar portion 4e of the resilient member body portion 4f. The vibration transmissibility T of the viscosity damper is determined in response to the number and the size of the holes 6b provided in the damping plate 6. The resilient member collar portion 4e and the operator cabin 1 are fixed to each other through the spacer 8 by a nut 10 and a lock washer 9 engaging an upper threaded portion 4i of the center shaft 4h. The upper flange 4a of the case body is fixed to the supporting frame 2b of the vehicle body by a bolt 11 and a nut 12. Also, the upper resilient stopper 4g is positioned outwardly from the periphery of the resilient member collar portion 4e with an upper surface of the upper resilient stopper 4g being spaced from an undersurface of the floor plate 1a of the operator cabin 1 by a predetermined distance.

Figure 3:
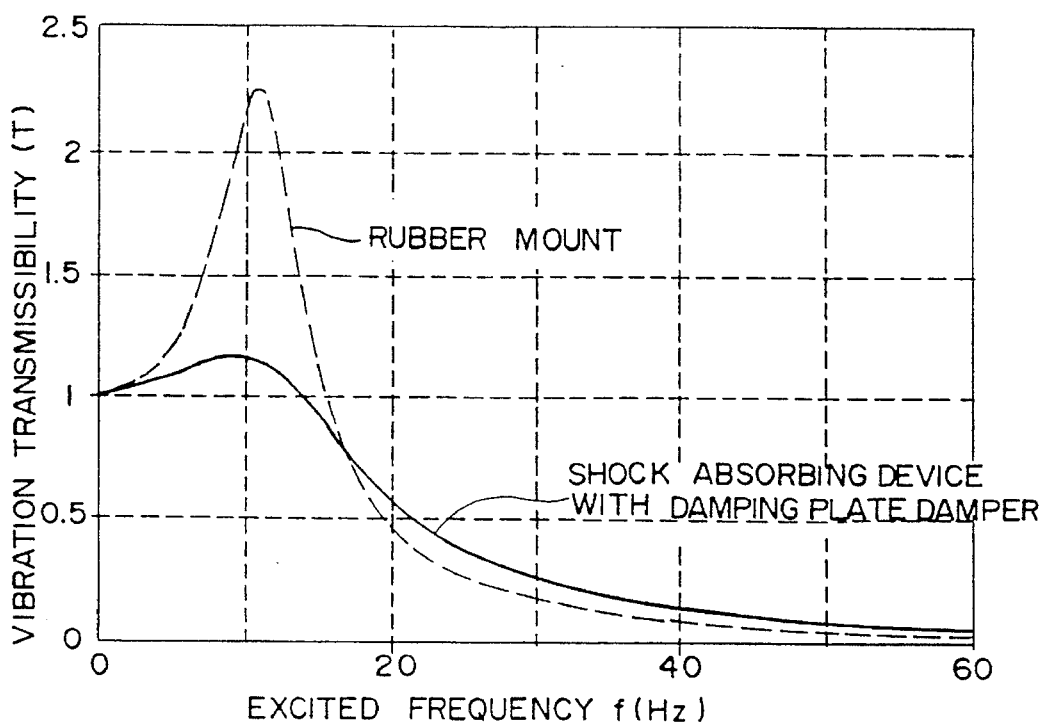
FIG. 3 is a comparison graph showing vibration transfer characteristics of an operator cabin shock absorbing device with a damping plate damper according to each embodiment of the present invention or with a rubber mount according to the prior art.

Next, the operation of the first embodiment of the present invention as shown in FIGS. 1 and 2 will be described. The weight of the operator cabin 1, in a state where the floor plate 1a of the operator cabin 1 rests on the upper surface of the resilient member collar portion 4e, is supported by the compressive force of the resilient member collar portion 4e and the shearing force of the resilient member body portion 4f. The center shaft 4h fixed to the floor plate 1a of the operator cabin 1 is supported by the resilient member collar portion 4e through the lowers flange 4a of the case body and the supporting frame 2b, which is fixed to the vehicle body, thus resiliently supporting the operator cabin 1 to the vehicle body. Therefore, the resilient member collar portion 4e and the resilient member body portion 4f resiliently resist any inclination from the vertical by the center shaft 4h, with the operator cabin 1 being fixed to the upper portion of the center shaft 4h, whereby rolling vibrations in every side direction can be certainly reduced. Also, by the viscosity damper having the damping plate 6 fixed to the lowers end of the center shaft 4h, and by the damper case 4d which contains the damping plate 6 being filled with silicon oil 7, the vibration transmissibility T of the shock absorbing device provided with a damping plate damper 4 as shown in FIG. 3 is determined in response to the number and the size of the holes 6b provided on the damping plate 6. In the construction according to the first embodiment, not only remarkable damping effects are achieved against the number of excited vibrations, which are changed by the conditions of running and operation applied in wide ranges by the construction machines and the like, but also upper and lower movement of the operator cabin 1 can be controlled by each resilient stopper 4g or 6a, whereby the floor plate 1a strikes the upper resilient stopper 4g or the lower stopper 6a strikes the lower flange 4b. In such a state of an increasing spring constant, upper and lower movement of the operator cabin is controlled, so that effective shock absorbing effects can be achieved for the operator cabin 1.

FIG. 3 is a comparison graph showing vibration transfer characteristics T of the shock absorbing device with a damping plate damper 4 according to each embodiment of the present invention or with a rubber mount according to the prior art, giving the excited frequency f (Hz) on the axis of abscissa and the vibration transmissibility T on the axis of ordinate. In FIG. 3, according to the prior art, shown with a broken line, the vibration transmissibility T is approximately 2.3 at an excited frequency f of approximately 11 Hz, while the vibration transmissibility T according to each embodiment of the present invention is approximately 1.2, i.e., thus, the vibration transmissibility T is reduced by almost half for the present invention.

Figure 4:
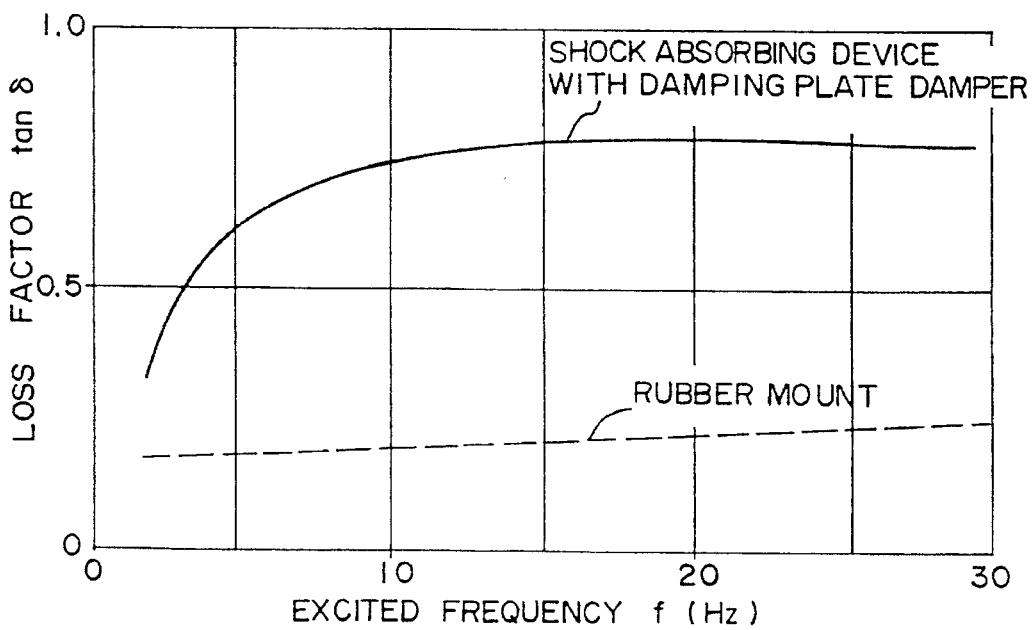
FIG. 4 is a comparison graph showing loss factors of an operator cabin shock absorbing device with a damping plate damper according to each embodiment of the present invention or with a rubber mount according to the prior art.

FIG. 4 is a comparison graph showing loss factors of the shock absorbing device with a damping plate damper 4 according to each embodiment of the present invention or with a rubber mount according to the prior art, giving the excited frequency f (Hz) on the axis of abscissa and the loss factor (tan δ) on the axis of ordinate. In FIG. 4, for the construction wherein the operator cabin 1 is placed on the rubber mounts of the prior art, the loss factors (tan δ), shown with a broken line, in a range of the excited frequencies f up to 30 Hz are within a range of approximately 0.2 to 0.25, while the loss factors (tan δ) in a range of the excited frequencies f up to 30 Hz are set in a range of approximately 0.2 to 0.25, while the loss factors according to each embodiment of the present invention are larger, approximately 0.8 or so, i.e., the damping effects according to the present invention are larger than the prior art.

Generally, the relation of the vibration transmissibility T and the loss factor (tan δ) is shown in the following equation.

$$T = \sqrt{1 + \tan^2\delta} / \sqrt{(1 - f/fn)^2 + \tan^2\delta} \tag{1}$$

wherein, f= excited frequency, fn= natural frequency.

As shown in FIG. 2, when the resilient member collar portion 4e and the floor plate 1a of the operator cabin 1 are fixed to each other through the spacer 8 by the use of a box spanner 13 to effect the engagement of the nut 10 and the lock washer 9 with the upper threaded portion 4i of the center shaft 4h by an application of a torque in the direction of the arrow, the rotation force on the center shaft 4h transmits a twist to the resilient member collar portion 4e and the resilient member body portion 4f, whereby it may be difficult to completely fasten. Furthermore, since the resilient member collar portion 4e and the resilient member body portion 4f are assembled in a twisted state, there arises another problem in that the durability of the resilient member collar portion 4e and the resilient member body portion 4f is deteriorated. Therefore, a lockpin can be placed between the center shaft 4h and the floor plate 1a of the operator cabin 1 in order to stop turning of the center shaft 4h. When it is necessary to mount a plurality of the shock absorbing devices provided with the damping plate damper 4, problems arise in that close dimensional tolerances of lockpins are required and the number of processes is increased.

Figure 5:
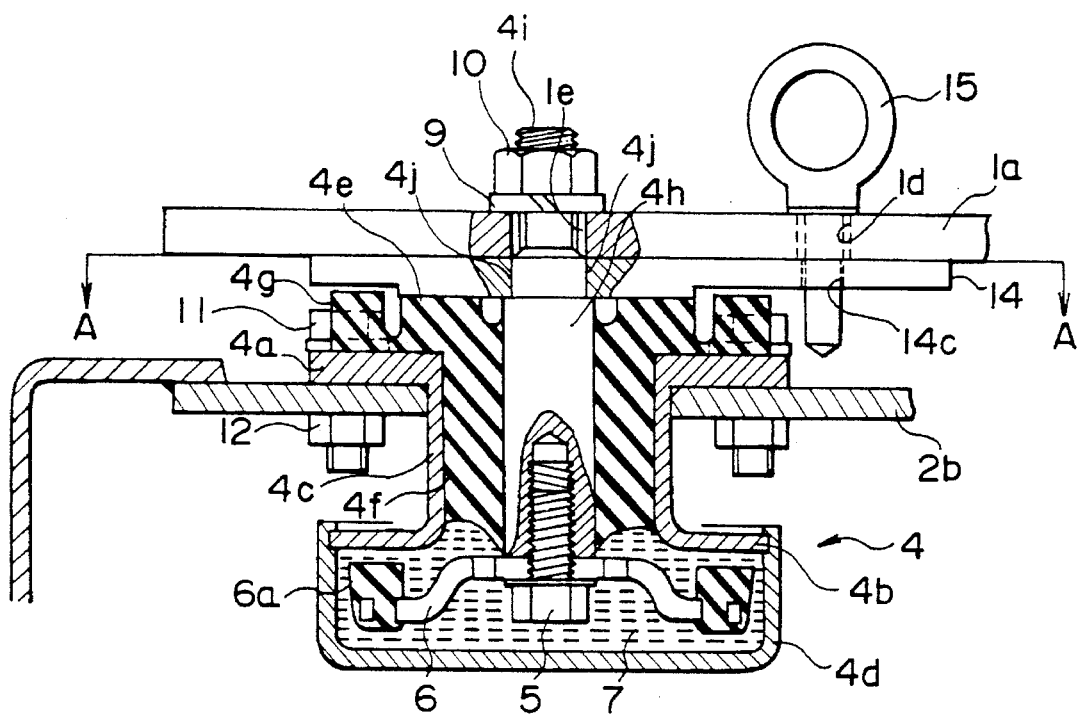
FIG. 5 is a longitudinal section, similar to FIG. 2, showing a shock absorbing device with a damping plate damper according to a second embodiment of the present invention.
Figure 6:
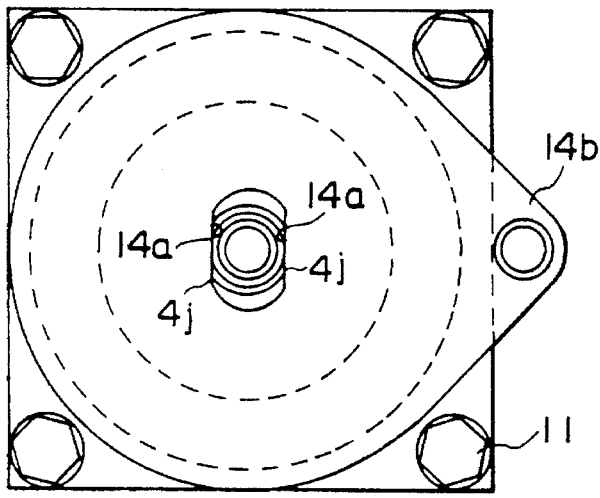
FIG. 6 is a cross-sectional view, taken on line A—A of FIG. 5.

FIGS. 5 and 6 are sectional views showing a construction for stopping rotation of the center shaft 4h in order to prevent twisting of the resilient member collar portion 4e and the resilient member body portion 4f according to the second embodiment of the present invention. Hereinafter, referring to FIGS. 5 and 6, the second embodiment of the present invention will be described. Since the relation of the placement of the shock absorbing device provided with the damping plate damper 4 to the upper turning body frame 2a and the operator cabin 1 is the same as that shown in FIG. 1, a detailed description thereof will be omitted. Also, for the construction which corresponds to that of the first embodiment of the present invention shown in FIG. 2, a detailed description of the construction and operation thereof will be omitted.

As shown in the drawings, the resilient member collar portion 4e is fastened through a spacer 14 to the floor plate 1a of the operator cabin 1 by the nut 10 engaging a threaded portion 4i of the center shaft 4h, and the upper flange 4a of the case body is fixed to the vehicle body, so that a resilient supporting device of the operator cabin 1 is provided. In the upper portion of the center shaft 4h, two vertical flats 4j—4j are formed which engage corresponding vertical flats 14a—14a formed on the spacer 14. A pin bolt 15 is engaged with a tapped hole 1d provided in the floor plate 1a of the operator cabin 1, whereby the pin portion of the bolt 15 extends through a pin hole 14c formed in a radial projection 14b of the spacer 14, thus preventing rotation of the center shaft 4h. Further, the upper flange portion 4a of the case body is fixed to the supporting frame 2b by the bolt 11 and the nut 12, and the upper surface of the upper resilient stopper 4g is positioned a predetermined distance from the undersurface of the spacer 14. In addition, since the relation of placement of the shock absorbing device provided with the damping plate damper 4 to the upper turning body frame 2a and the operator cabin 1 is the same as that shown in FIG. 1, a description thereof will be omitted.

Next, the operation of the second embodiment will be described. When the shock absorbing device provided with the damping plate damper 4 attached to the supporting frame 2b of the upper turning body 2a is fixed to the floor plate 1a of the operator cabin 1, the flats 4j—4j of the center shaft 4h fit in a slot in the spacer 14 having the corresponding flats 14j—14j. A threaded portion 4i of the tip of the center shaft 4h is located relative to a hole 1e in the floor plate 1a, and then the operator cabin 1 is moved downwardly until the upper surface of the spacer 14 contacts the undersurface of the floor plate 1a.

Also, when the pin bolt 15 is engaged from above with the threaded portion 1d of the floor plate 1a, the pin portion of the pin bolt 15 extends into the pin hole 14c of the spacer 14. Thereafter, although the floor plate 1a is fastened to the shock absorbing device by the nut 10 and the lock washer 9 engaging the threaded portion 4i of the center shaft 4h, the flats 14a—14a and 4j—4j and the pin bolt 15 prevent the turning of the center shaft 4h, whereby twisting of the resilient member collar portion 4e and the resilient member body portion 4f, as produced in the conventional devices, can be avoided.

Figure 7:
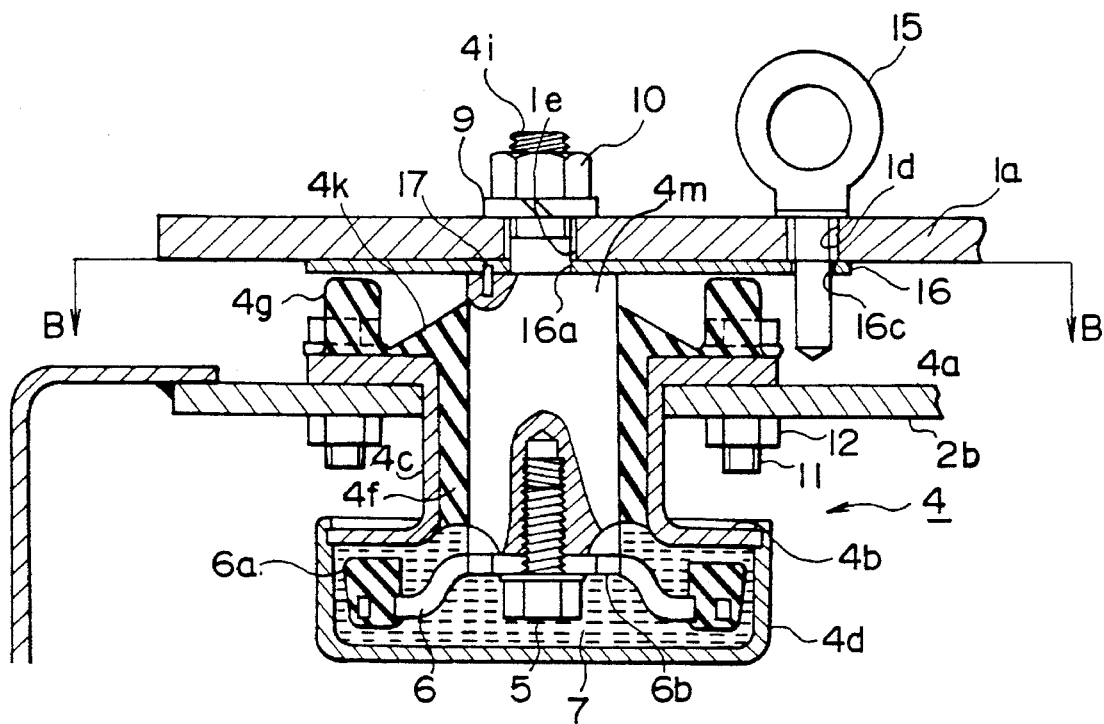
FIG. 7 is a longitudinal section, similar to FIG. 2, showing a shock absorbing device with a damping plate damper according to a third embodiment of the present invention.
Figure 8:
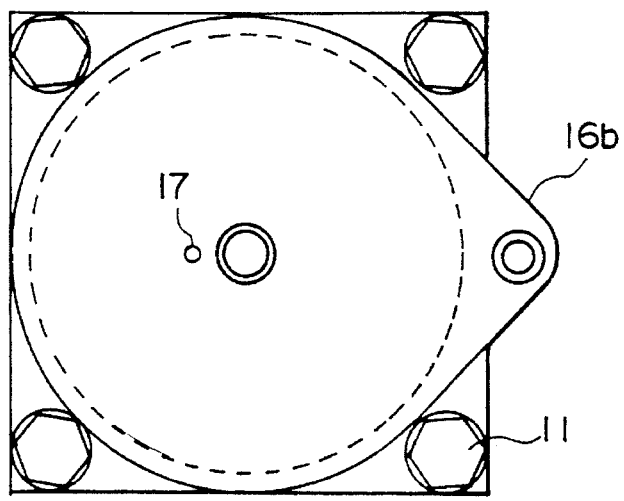
FIG. 8 is a cross-sectional view, taken on line B—B of FIG. 7.
Figure 9:
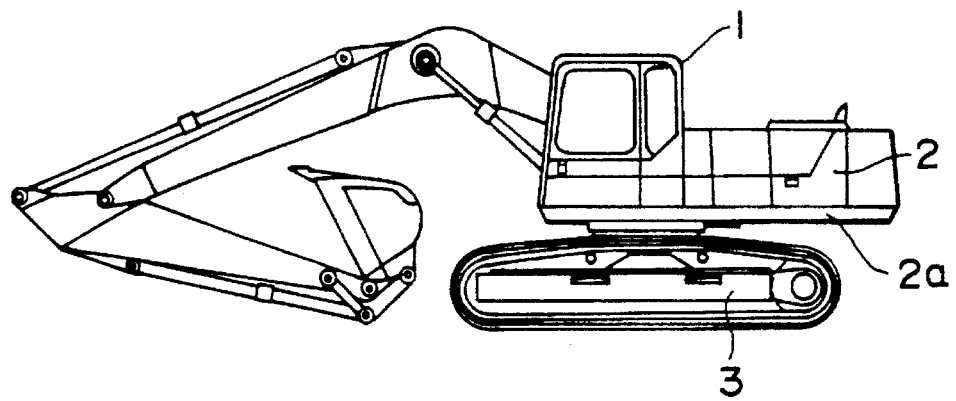
FIG. 9 is a side view showing the appearance of a typical hydraulic power shovel.
Figure 10:
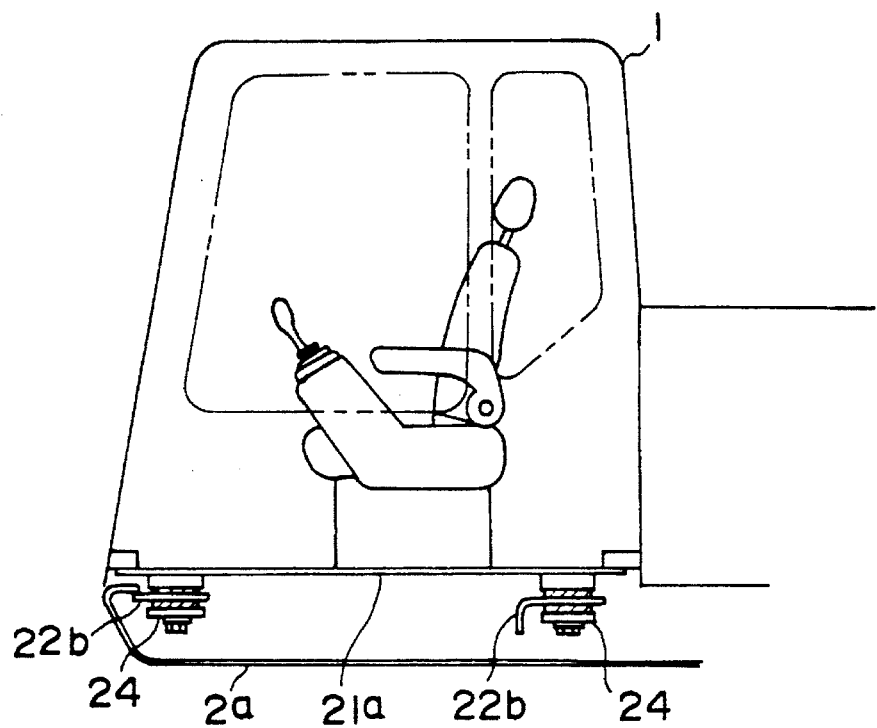
FIG. 10 is a longitudinal section showing the relation of placement between an operator cabin 1 and an upper turning body frame 2a shown in FIG. 9 according to the prior art.
Figure 11:
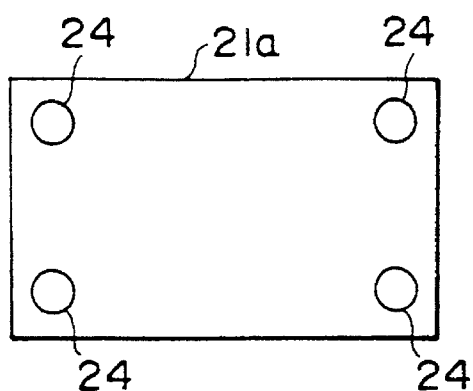
FIG. 11 is a plan view showing the locations of the shock absorbing devices 24 illustrated in FIG. 10.
Figure 12:
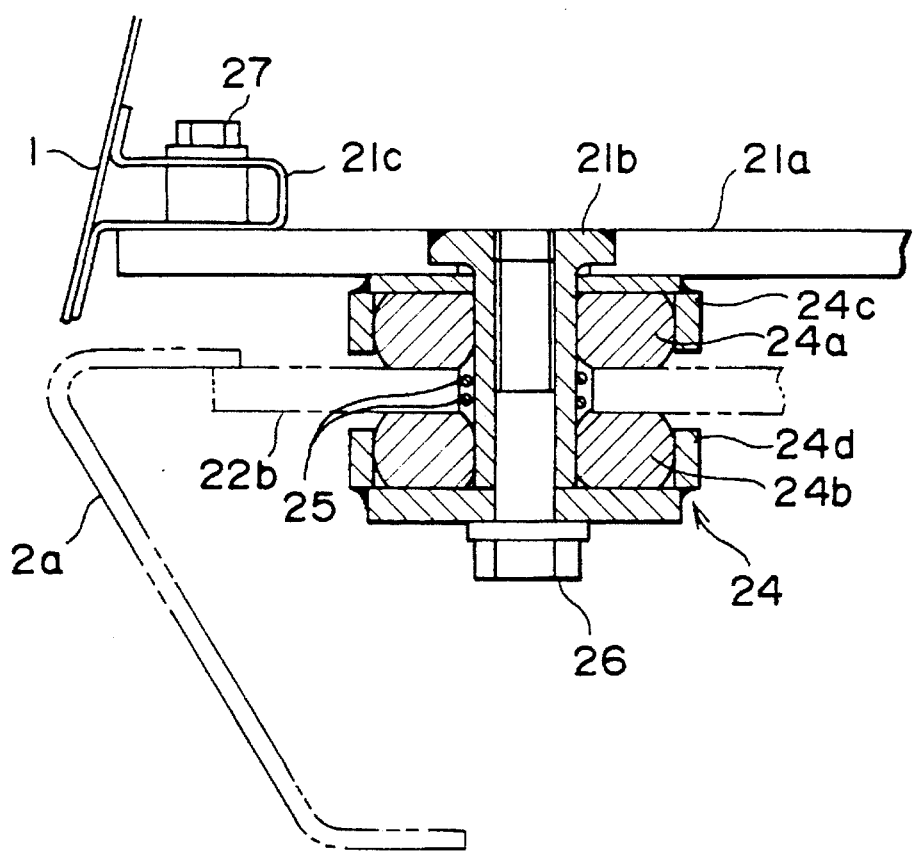
FIG. 12 is a detailed longitudinal section showing the vicinity of a shock absorbing device 24 illustrated in FIG. 10.

FIGS. 7 and 8 are sectional views showing the construction for stopping rotation of a center shaft 4m in order to prevent twisting of the resilient member collar portion 4e and the resilient member body portion 4f according to the third embodiment of the present invention. Hereinafter, referring to FIGS. 7 and 8, the third embodiment of the present invention will be described. In addition, since the relation of placement of the shock absorbing device provided with the damping plate damper 4 to the upper turning body frame 2a and the operator cabin 1 is the same as that shown in FIG. 1, a detailed description thereof will be omitted. Also, for the construction which corresponds to the first embodiment of the present invention shown in FIG. 2, a detailed description of the construction and operation thereof will be omitted.

An upper surface of a collar portion 4k of a collared resilient member is different from that of the second embodiment as the upper surface thereof does not strike the floor plate 1a of the operator cabin 1, whereby the operator cabin 1 is supported by shearing force of the resilient member collar portion 4k and the resilient member body portion 4f. The center shaft 4m and the floor plate 1a of the operator cabin 1 are fastened to each other through a spacer 16 by the nut 10 and the lock washer 9 engaging the threaded portion 4i of the center shaft 4m, and the lower flange 4a of the case body is fixed to the supporting frame 2b of the upper turning body 2a by the bolt 11 and the nut 12, so that a resilient supporting device of the operator cabin 1 is provided.

The pin bolt 15 engages the tapped hole 1d formed in the floor plate 1a of the operator cabin 1, and the pin portion of the pin bolt 15 extends into a pin hole 16c formed in a radial projection 16b of the spacer 16. Rotation of the spacer 16 around the center shaft 4m is prevented by a lockpin 17. Also, the upper flange portion 4a of the case body is fixed to the supporting frame 2b by the bolt 11 and the nut 12.

Next, the operation of the third embodiment will be described. When the shock absorbing device provided with the damping plate damper 4 attached to the supporting frame 2b of the upper turning body 2a is fixed to the floor plate 1a of the operator cabin 1, a bolt hole in the spacer 16 is located relative to a threaded portion 4i of the center shaft 4m and the lockpin 17 is placed in a pin hole in the spacer 16 and in a pin hole in the center shaft 4m, whereby the spacer 16 and the center shaft 4m are assembled.

Next, the threaded portion 4i of the tip of the center shaft 4m is located relative to the hole 1e in the floor plate 1a, and then the operator cabin 1 is moved downwardly until the undersurface of the floor plate 1a contacts the upper surface of the spacer 16. Thereafter, the pin bolt 15 is inserted from above into the bolt hole 1d of the floor plate 1a, with the pin portion of the pin bolt 15 extending into the pin hole 16c of the spacer 16, and the floor plate 1a is fastened to the center shaft 4m and the spacer 16 by using a wrench to cause the nut 10 and the lock washer 9 to engage with the threaded portion 4i of the center shaft 4m, so that the rotation of the center shaft 4m is prevented, whereby twisting of the resilient member collar portion 4k and the resilient member body portion 4f, as produced in the conventional devices, can be avoided.

INDUSTRIAL APPLICABILITY

The present invention is to provide an effective resilient supporting device for resiliently supporting an operator cabin against a vehicle body of a construction machine, such as a hydraulic power shovel, so that the riding comfort for an operator and the mechanical strength of the operator cabin can be improved.

What is claimed is:

1. A machine having a vehicle body, an operator cabin, and a resilient supporting device for resiliently supporting said operator cabin on said vehicle body, said resilient supporting device comprising a shock absorbing device having a damping plate damper, wherein said shock absorbing device having a damping plate damper comprises:

a case;

a center shaft positioned within said case and having a length within said case;

a resilient member positioned between and connected to said center shaft along substantially the length thereof within said case and to said case and defining with said case a chamber in a lower portion of said case, said chamber containing a viscous substance; and a damping plate fixed to a bottom end portion of said center shaft and positioned within said viscous substance;

said operator cabin being secured to an upper end portion of said center shaft.

2. A machine having a vehicle body, an operator cabin, and a resilient supporting device for resiliently supporting said operator cabin on said vehicle body, said resilient supporting device comprising a shock absorbing device having a damping plate damper, wherein said shock absorbing device having a damping plate damper comprises:

a case body comprising an upper flange, a body part, and a lower flange; said case body having a top end and a bottom end;

a collared resilient member having a body portion and a collar portion; said collar portion of said collared resilient member having an upper surface and an undersurface; said body portion of said collared resilient member having an inner surface and an outer surface; said outer surface of the body portion of said collared resilient member and said undersurface of the collar portion of said collared resilient member being connected to said case body;

a center shaft having an upper end portion, a central portion, and a bottom end portion; said central portion of said center shaft being connected to said inner surface of said body portion of said collared resilient member;

a damper case secured to said bottom end of said case body and containing a viscous substance; and a damping plate fixed to said bottom end portion of said center shaft and positioned within said viscous substance;

said operator cabin being secured to said upper end portion of said center shaft.

3. A machine in accordance with claim 2, further comprising a connector for connecting said upper flange of said case body to said vehicle body.

4. A machine in accordance with claim 2, wherein said outer surface of the body portion of said collared resilient member is connected to an inner surface of said body part of said case body, and wherein said undersurface of the collar portion of said collared resilient member is connected to an upper surface of said upper flange of said case body.

5. A machine in accordance with claim 2, wherein said central portion of said center shaft is connected to said inner surface of said body portion of said collared resilient member and to an inner surface of said collar portion of said collared resilient member.

6. A machine in accordance with claim 2, wherein said operator cabin comprises a floor plate having an opening therethrough, wherein said upper end portion of said center shaft comprises a threaded portion which extends through said opening in said floor plate of said operator cabin, and wherein a nut is provided in engagement with said threaded portion of said center shaft so as to secure said center shaft to said operator cabin, whereby said operator cabin is supported on said upper surface of said collar portion of said collared resilient member.

7. A machine in accordance with claim 2, further comprising a spacer positioned between said operator cabin and said collared resilient member, said spacer having an opening therethrough, wherein said center shaft extends through said opening in said spacer.

8. A machine in accordance with claim 7, wherein the opening in said spacer is provided with flats, and wherein said center shaft is provided with flats which engage the flats of said spacer to prevent rotation of said center shaft with respect to said spacer.

9. A machine in accordance with claim 8, further comprising a pin hole in said operator cabin and a mating pin hole in said spacer, and a pin extending through said pin hole in said operator cabin and said pin hole in said spacer to prevent rotation of said spacer with respect to said operator cabin.

10. A machine in accordance with claim 7, further comprising a hole in said spacer and a mating hole in said center shaft, and a lockpin extending through said hole in said spacer and said hole in said center shaft to prevent rotation of said spacer with respect to said center shaft.

11. A machine in accordance with claim 10, further comprising a pin hole in said operator cabin and a mating pin hole in said spacer, and a pin extending through said pin hole in said operator cabin and said pin hole in said spacer to prevent rotation of said spacer with respect to said operator cabin.

12. A machine in accordance with claim 2, further comprising an upper resilient stopper connected to said case body for controlling lower movement of said operator cabin, said upper resilient stopper being spaced outwardly from the periphery of the collar portion of said collared resilient member; and a lower resilient stopper for controlling upper movement of said operator cabin, said lower resilient stopper being connected to an upper surface of said damping plate.

13. A machine in accordance with claim 12, further comprising a spacer positioned between said operator cabin and said collared resilient member, said spacer having an opening therethrough, wherein said center shaft extends through said opening in said spacer, and wherein said upper resilient stopper is spaced a predetermined distance from said operator cabin.

14. A machine in accordance with claim 13, wherein the opening in said spacer is provided with flats, and wherein said center shaft is provided with flats which engage the flats of said spacer to prevent rotation of said center shaft with respect to said spacer.

15. A machine in accordance with claim 14, further comprising a pin hole in said operator cabin and a mating pin hole in said spacer, and a pin extending through said pin hole in said operator cabin and said pin hole in said spacer to prevent rotation of said spacer with respect to said operator cabin.

16. A machine in accordance with claim 13, further comprising a hole in said spacer and a mating hole in said center shaft, and a lockpin extending through said hole in said spacer and said hole in said center shaft to prevent rotation of said spacer with respect to said center shaft.

17. A machine in accordance with claim 16, further comprising a pin hole in said operator cabin and a mating pin hole in said spacer, and a pin extending through said pin hole in said operator cabin and said pin hole in said spacer to prevent rotation of said spacer with respect to said operator cabin.

18. A machine in accordance with claim 17, wherein said outer surface of the body portion of said collared resilient member is connected to an inner surface of said body part of said case body, and wherein said undersurface of the collar portion of said collared resilient member is connected to an upper surface of said upper flange of said case body.

19. A machine in accordance with claim 2, further comprising a connector for connecting said upper flange of said case body to said vehicle body; wherein said outer surface of the body portion of said collared resilient member is connected to an inner surface of said body part of said case body, and wherein said undersurface of the collar portion of said collared resilient member is connected to an upper surface of said upper flange of said case body.

20. A machine in accordance with claim 19, wherein said central portion of said center shaft is connected to said inner surface of said body portion of said collared resilient member and to an inner surface of said collar portion of said collared resilient member, wherein said operator cabin comprises a floor plate having an opening therethrough, wherein said upper end portion of said center shaft comprises a threaded portion which extends through said opening in said floor plate of said operator cabin, and wherein a nut is provided in engagement with said threaded portion of said center shaft so as to secure said center shaft to said operator cabin.

* * * * *